(12) United States Patent
Robb

(10) Patent No.: US 8,376,756 B2
(45) Date of Patent: Feb. 19, 2013

(54) MULTI-CONTACT UNIVERSALLY JOINTED POWER AND/OR SIGNAL CONNECTOR DEVICES CONSTRUCTED UTILIZING DEFORMED PRINTED CIRCUIT BOARDS

(76) Inventor: John R. Robb, Stafford, TX (US)

( * ) Notice: Subject to any disclaimer, the term of this patent is extended or adjusted under 35 U.S.C. 154(b) by 347 days.

(21) Appl. No.: 12/924,390

(22) Filed: Sep. 27, 2010

(65) Prior Publication Data

US 2011/0081788 A1 Apr. 7, 2011

Related U.S. Application Data

(63) Continuation-in-part of application No. 12/316,413, filed on Dec. 12, 2008, now Pat. No. 7,854,614.

(60) Provisional application No. 61/007,746, filed on Dec. 14, 2007.

(51) Int. Cl.
*H01R 35/00* (2006.01)
(52) U.S. Cl. ............................................. 439/8; 439/271
(58) Field of Classification Search .................. 439/6, 8, 439/9
See application file for complete search history.

(56) References Cited

U.S. PATENT DOCUMENTS

| | | | | | |
|---|---|---|---|---|---|
| 3,328,741 | A | * | 6/1967 | Brown | 439/8 |
| 3,797,862 | A | * | 3/1974 | Letterman | 280/422 |
| 4,978,306 | A | * | 12/1990 | Robb | 439/8 |
| 7,170,047 | B2 | * | 1/2007 | Pal | 250/231.13 |
| 7,540,748 | B2 | * | 6/2009 | Tracy et al. | 439/131 |
| 7,854,614 | B2 | * | 12/2010 | Robb | 439/8 |
| 2009/0154883 | A1 | * | 6/2009 | Robb | 385/56 |
| 2010/0157601 | A1 | * | 6/2010 | Robb | 362/249.06 |
| 2011/0026883 | A1 | * | 2/2011 | Robb | 385/56 |
| 2011/0081788 | A1 | * | 4/2011 | Robb | 439/8 |
| 2012/0258608 | A1 | * | 10/2012 | Robb | 439/8 |

* cited by examiner

*Primary Examiner* — James Harvey
(74) *Attorney, Agent, or Firm* — Sue Z. Shaper

(57) ABSTRACT

An adjustable at least three-way electrical connector device for signal, power, voice and/or data communication, comprising at least three adjustable electrical connections utilizing a ball and socket type physical connection device, preferably including a weatherproofing gasket, and further including being constructed utilizing deformable printed circuit boards, deformed and embedded in thermosetting plastic material with elastomeric properties, and including methods of construction.

6 Claims, 18 Drawing Sheets

PCB1

ECP6

PCB1

ECS4

ECP5

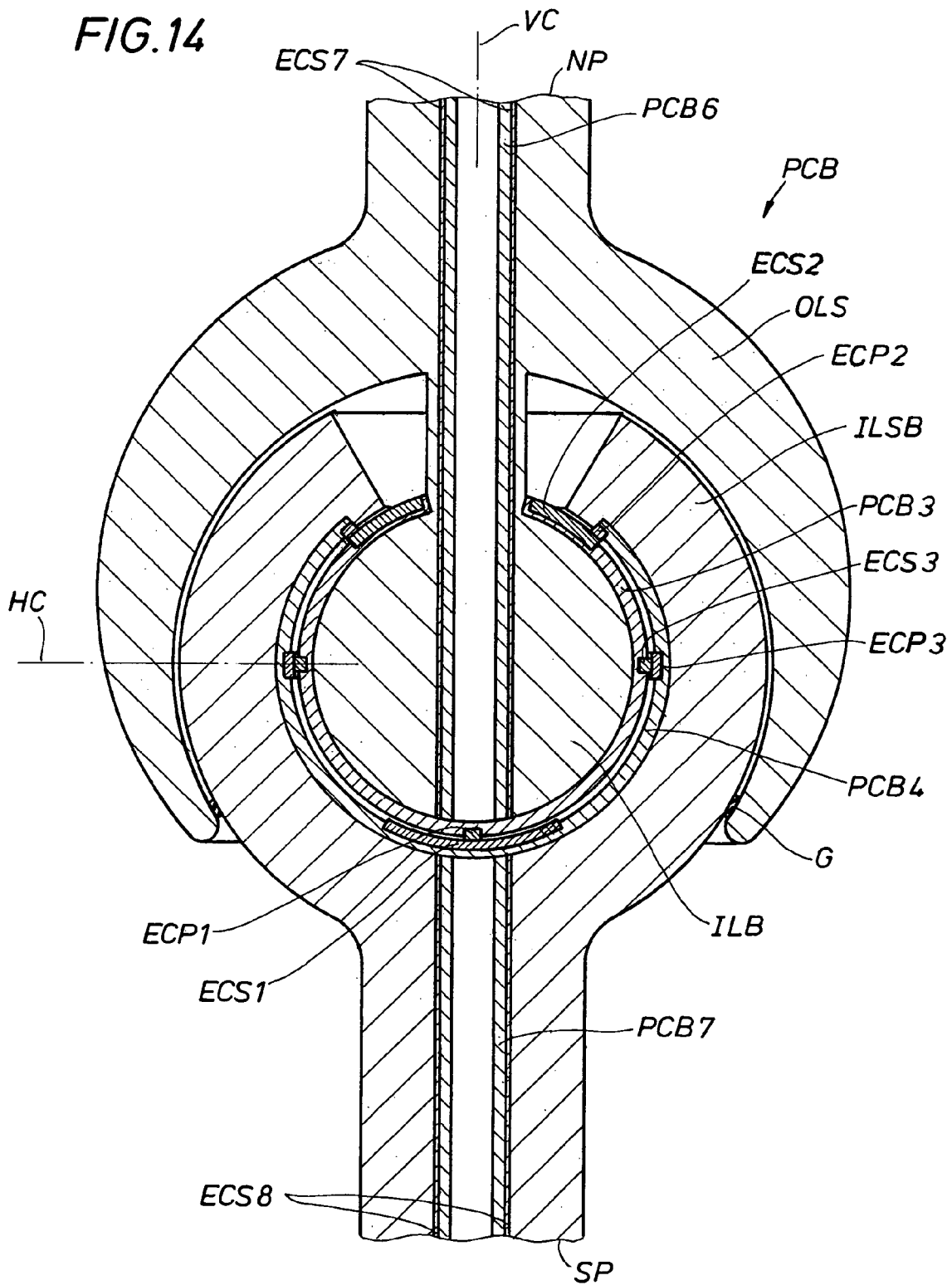

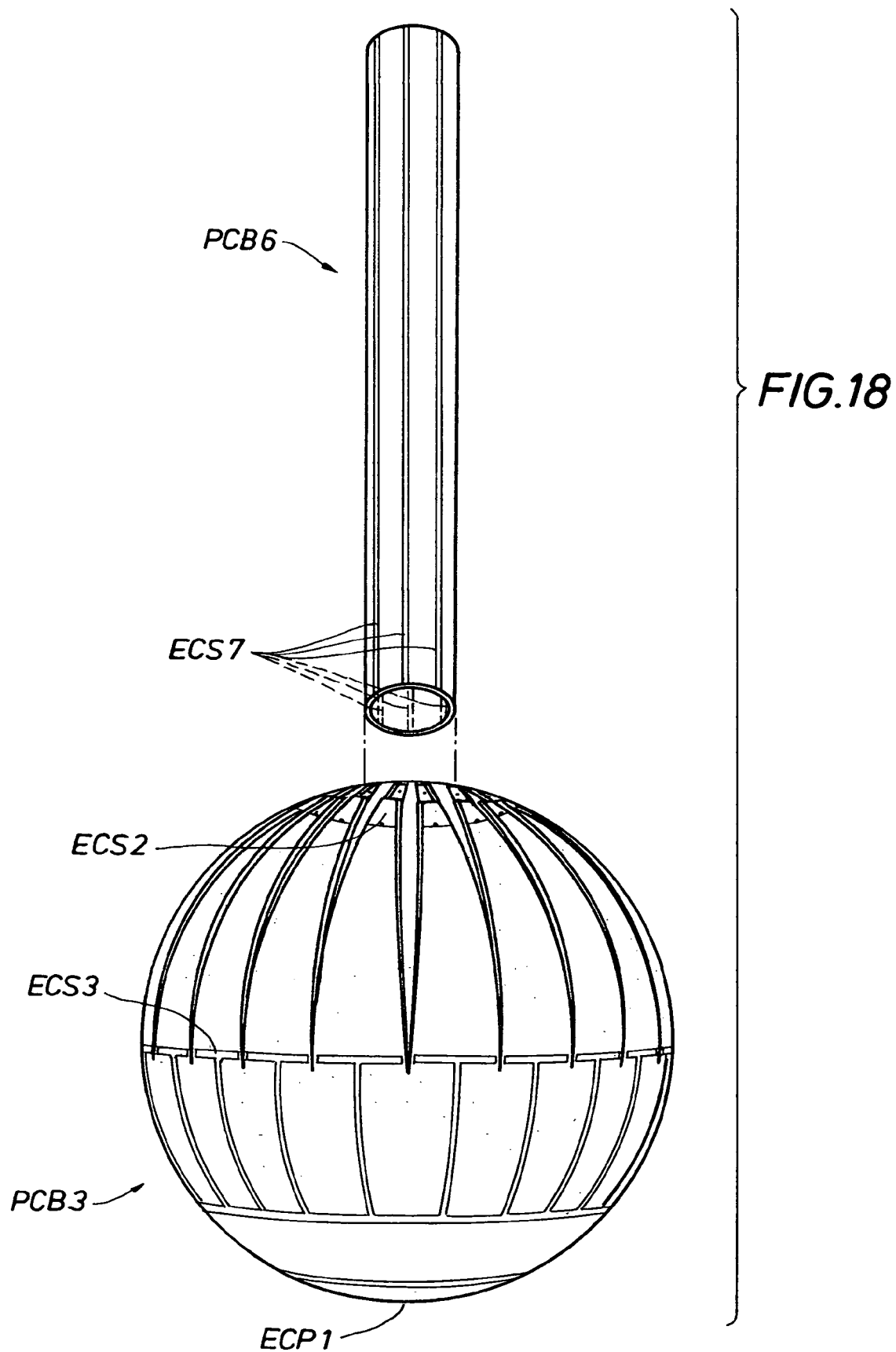

MULTI-CONTACT UNIVERSALLY JOINTED POWER AND/OR SIGNAL CONNECTOR DEVICES CONSTRUCTED UTILIZING DEFORMED PRINTED CIRCUIT BOARDS

CROSS REFERENCE TO RELATED APPLICATIONS

This application is related to, is a continuation-in-part of and claims priority to, application Ser. No. 12/316,413, filed Dec. 12, 2008, entitled Multi-Contact Universally Jointed Power and/or Signal Connector Device, inventor John R. Robb, which claims priority to and is, in-turn, a Continuation-in-Part of, Provisional Application Ser. No. 61/007,746, filed Dec. 14, 2007, entitled Improvements to Snap-apart Universal Jointed Electrical Connector Device, with the same inventor. Both said related applications, to which priority is herein and hereby claimed, are hereby incorporated herein by reference in their entirety.

FIELD OF THE INVENTION

The invention relates to connector devices for communicating power and/or data signals, including electrical and/or optical signals, and in particular the instant invention provides a (preferably snap-apart and snap-together) multi-contact universally jointed connector device constructed using deformed printed circuit boards (PCBs).

BACKGROUND OF THE INVENTION

The instant invention also represents an improvement to my prior invention embodied in two prior patents, U.S. Pat. Nos. 4,978,306 and 5,018,980. Both of the said patents are also hereby herein incorporated by reference in their entirety.

The instant invention relates to designs for a (preferably snap-apart) connection device for power, electrical and/or optical signals. One embodiment of the invention provides at least three contacts. Preferably at least four contacts are provided. The device is particularly applicable for telecommunications, for communication of voice and/or data information, as well as for other electrical communication where multi-contacts are required or desired. Features of the invention include a universal joint as well as a preferably snap-apart snap-together connection. A particular feature of the invention is construction using deformed PCBs embedded in thermosetting plastic with elastomeric properties.

The preferably snap-apart electrical connection device can function as an at least three-contact connector, and preferably an at least four-contact universally jointed connector, particularly applicable for telecommunication uses. The ability of one element or layer of the connector, at times referred to as "a ball," to rotate essentially endlessly with respect to another element or layer of the connection device, at times referred to herein as "a socket," alleviates tangling issues. The further provision for tilting or pivoting of one layer with respect to the other layer of the connection device, to a significant extent, also alleviates potential tangling of electrical or communication lines.

The four-contact embodiment occurred to me while sitting at a desk, frustrated with a tangle of a spiral cord on a telephone. When either answering or completing telephone calls, it is natural to rotate the telephone handset upon pick-up and return to the desk device. With multiple phone calls, the cord between the handset and the desk device becomes twisted. When twisted, it is very difficult to straighten out. Usually, you have to disconnect the cord from either the handset or the desk device. Then, you spend a significant amount of time untwisting the cord, which will not just unwind by itself. When you are done, the spiral design of the cord is usually kinked. Additional time has to be spent working the kinks, one spiral at a time, all the way to the end of the cord. When finished the spiral cord between the telephone handset and desk device is usually not the same as before the tangle occurred. The cord is damaged and never again will be as "good as new."

I initially wondered if there were a way to prevent the twisting and tangling from occurring in the first place. If you could, then there would be savings of frustration, time spent untangling and restoring the coil design of the telephone cord, prevention of damage to the cord itself, and savings of cost associated with replacing tangled and damaged telephone cords. This was when it occurred to me that, with improvement, my prior design for a snap-apart electrical connection device, referenced above, could also be applicable in telecommunications which required at least four contacts.

The "ball and socket" nature of a snap-apart electrical connection, as previously disclosed, would permit the required "rotation" needed to eliminate tangling, damage, and unnecessary replacement of the telephone cord. In addition to the positive, negative, and ground points of contact, needed for an electrical circuit, a fourth point of contact, however, would be needed to allow for a new and fundamentally different application of the prior snap-apart electrical connection device to the telecommunications industry. The availability of a location for the fourth connection point was not initially or readily apparent.

The prior art, embodied in my prior snap-apart electrical device, relies on the three-dimensional geometric properties of a sphere. It uses the two "poles" and "equator" of a sphere to accommodate rotation of the "ball" while, at the same time, maintaining constant connection via the "socket." Segregation of electrical contact points to the ends and middle of the sphere, and the resulting space between contact points, is necessary to prevent short-circuiting of the rotating electrical connection that the snap-apart device permits. See above referenced patents incorporated by reference.

Within the rigid geometry of a sphere, it was not immediately obvious how provision of a fourth point of contact could be accomplished. There are only two poles and one equator associated with any sphere. Telephone conversations need four contact points. A fourth contact point did not seem possible initially for the snap-apart electrical connection device I had previously invented.

An inventive idea subsequently suggested itself, to the effect that if the "socket" of my prior art snap-apart electrical connector could also function as a "ball," and if the "ball" of my prior art connector could be improved upon to further incorporate an outer layer "socket" or shell, then there could be an opportunity to provide a fourth connector as needed for telephone conversations. Indeed, even a fifth and/or a sixth was possible, as illustrated herein. To accomplish this improvement, I redesigned the inner layer "ball" component of my prior art connector by incorporating with it an outer layer "shell," of the same flexible non-conducting material. This redesign created the third layer, the "shell," needed to provide a location for the fourth electrical connection point. As discussed above, even a fifth or a sixth connection point could be created.

For a fourth conductive path, an electrically conductive surface could be located inside the new flexible outer layer or "shell," at the top, or north, "pole" into which the "socket" from the prior art device now inserts as a ball. To complete the required fourth electrical connection, an electrically conductive contact point could be incorporated onto the exterior of the prior art "socket," now turned into an intermediate ball/socket layer, near the top "pole" opening provided for insertion of the prior art "ball."

Thus, redesigning the "ball" of the prior art snap-apart electrical connection device to now incorporate a third layer, an outer shell, provided one-half of the structure necessary for the fourth connection. The "socket" of the prior art snap-apart electrical connection, now redesigned as an intermediate layer functioning as both a ball and a socket, provides the other half of the fourth connection. The new intermediate layer snaps over the prior art "ball" and into the newly designed outer "shell" layer.

Not being certain that such a novel snap-apart electrical connection device could actually be constructed for application as a connector for telecommunication devices, I constructed a prototype model of the improvements needed for a telecommunications use. Construction and testing of the prototypical model demonstrated the feasibility of providing the fourth connection point. Operation of the prototypical model showed that a redesign of the prior art does provide an opportunity for at least the fourth connection necessary for the use of the snap-apart electrical connector in the telecommunication field. The new invention transformed the prior art into the type of connector that could be used in a new industry.

With this improvement, the snap-apart electrical connector could now be used for any telephone cord. In use, it would allow rotation of the cord in the socket and prevent damage due to tangling. In addition, the snap-apart feature eliminates the problems that arise when the plastic tab, needed to mechanically hold a typical communications connector into its socket and maintain the connection, has broken off accidentally and/or from frequent connection and disconnection.

Furthermore, while constructing the "shell" improvement, I realized that it provided an additional opportunity to further improve the prior art snap-apart electrical connection device. The addition of the new "shell" to the prior art "ball" provided the opportunity to add a "gasket" on the inside surface of the "shell" improvement. The gasket provides insulation from the environment.

As the "shell" improvement permits the "socket" of the prior art to now also act as a "ball" within the new "shell," a flexible, weather-proof gasket could be incorporated near the opening of the "shell." When the "socket" of the prior art is snapped over the "ball" and into the new shell, both "shell" and gasket" expand and encase a portion of the exterior of the prior art "socket." By enclosing the prior art "socket" with a "shell" and "gasket," a weather-proof seal is created while continuing to permit rotation of the prior art "plug" within the prior art "socket." As a result, the entire snap-apart connection device, whether used for telecommunications or for simple electrical connections, could be protected from a dangerous invasion of moisture. Thus in summary, the new "shell," that provides a third layer and enables a fourth connection point, necessary at least for telecommunications, also permits an unforeseen opportunity to provide a "gasket" necessary to permit use of the snap-apart electrical device in moisture prone locations and environments. In combination, these improvements to the prior art embodied in the snap-apart electrical device I previously developed, have addressed applications that were not previously foreseeable.

Please see the attached FIG. 1 for an illustration of the four contact point improvements described above. Please also note that spheres rotating within spheres will always have contact at the intersections of their equators. Please further note that, beyond those disclosed in the attached drawings, additional "shells" can be added to both "ball" and "socket," thereby providing additional contact "points." FIG. 4 illustrates such embodiments, particularly useful for multiple digital data channels.

The electrical plug described by prior art has further been improved to create a multi-channel connection device that is capable of transmitting not only electrical current, but also a plurality of channels of voice and digital data. The device shown in FIG. 4 discloses improvements on prior art as follows. Development of a first thermoplastic shell to the "ball," and a second similar shell on the "socket" provides additional contact points for transmission of multiple electronic signals needed for telecommunication of voice and digital data. Beyond contact points needed for electrical power, multiple points of contact permit the faster transmission of data associated with various computer protocols. Incorporation of this telecommunications related, specifically digital data, improvement to the snap-apart electrical connection disclosed in the above referenced patents allows use of the device as a multi-channel digital connector device for applications controlled by computer programming technologies. Incorporation of further weather-proof gaskets enhances use of the device in outdoor environments.

My prior universally jointed three-way connector device had provided difficulties in construction and manufacturing. The four-way, five-way and six-way connector device multiplied significantly those difficulties. Hence, subsequent to making the above inventions, I directed attention to the complexity of manufacture of practical embodiments of the inventions, including the prior art three-connector device. I devised an embodiment for, and invented a method of constructing, multiple connection devices, as disclosed above, using deformable printed circuit boards (PCB). The goal of the new inventive embodiment and method is to achieve multiple electrical connections while simplifying the manufacturing process for a preferably snap apart universally jointed multiple connector electrical plug device.

An overview of a set of major manufacturing steps for one preferred embodiment of the instant invention, including up to a six contact connector device, is as follows:

Step 1 Multiple Printed Circuit Boards (PCB), of differing designs, are printed flat using a copper foil stamping technique on a sheet of heat deformable plastic while simultaneously cutting the sheet of deformable plastic into desired shape. Each PCB has unique stamping on a "Side A" and "Side B" that permits adequate separation of electrical circuitry.

Step 2 Circuitry on Side A is connected to the appropriate circuitry on Side B by a punching and soldered technique at specific "contact points."

Step 3 Using a heat molding technique the thus stamped, cut and punch soldered PCB is "deformed" into hemispherical shapes and/or cylindrical shapes (PCB 6 & 7 only in the figures) of the appropriate diameter.

Step 4 Groups of deformed PCBs are assembled using PCB 6 (Assembly A) and PCB 7 (Assembly B) of the figures as an "armature" that passes through the centers of some PCB components.

Step 5 A soldering technique joins individual PCB components to the "armature" and completes electrical circuitry for the "Assembly" (Assembly A & B) of PCB components.

Step 6 Electrically conductive wire is soldered to "contact points" at the end of the "armatures" (PCB 6 and PCB 7) of both Assembly A and Assembly B.

Step 7 Assembly A and Assembly B are placed in their own separate, unique injection molding dies and subsequently embedded in a thermosetting plastic material with elastomeric properties that will permit repeated de-coupling of the "snap-apart" electrical plug device.

The use of an "armature" with an assembly of PCB components, which is then encased in injection molded thermoset plastic, simplifies manufacture of the snap-apart plug device and adds overall structural strength to the finished device.

SUMMARY OF THE INVENTION

The invention comprises an adjustable at least three-way connector, particularly useful for electrical and telecommunications, including at least three electrical connections provided within a layered ball and socket type connector device constructed using deformable PCBs. The ball and socket type connector provides for full rotation of an at least an inner ball layer within an outer socket layer about a first axis and provides for at least approximately up to 30 degrees of pivot of the inner ball layer with respect to the outer socket layer. Intermediate layers many be involved. Preferably the adjustable electrical connector device would snap together and apart and incorporate a protective insulating gasket between the outer and intermediate layers. In a four-way connector device the ball and socket type connector can provide for full rotation of an intermediate layer with respect to an outer and an inner layer and for pivot of the intermediate layer with respect to the outer and inner layers, up to approximately 30 degrees.

The adjustable, at least three-way electrical connector device for signal, voice, digital data and/or power as above described is constructed according to the instant invention wherein the connector includes multiple deformable printed circuit boards, deformed to appropriate ball and socket (and intermediate layer or shell) conformations, and is preferably embedded in a thermosetting plastic material with elastomeric properties effective to permit repeated coupling and de-coupling.

Preferred embodiments include a method for forming an adjustable, at least three-way electrical connector for signal, voice, digital data and/or power, comprising printing and shaping multiple printed circuit boards (PCBs) on sheets of heat deformable plastic having a first side and a second side that permit adequate separation of electrical circuitry. The method includes selectively connecting circuitry on the first side to the second side and deforming, preferably by heat molding, the printed circuit boards into appropriate three-dimensional shapes. The method preferably includes assembling the boards into two matable, three-dimensional configurations and embedding the two configurations in thermosetting plastic material with elastomeric properties that permit repeated coupling and de-coupling of the two embedded configurations.

Preferably the printed circuit boards are printed flat using a copper foil stamping technique. The first side and the second side of the plastic sheet is preferably connected by puncturing and soldering at specific connection points. The PCB boards are deformed into hemispherical and/or cylindrical shapes of appropriate diameter and the invention includes assembling the PCB boards into two configurations and preferably wherein two PCBs are formed into cylindrical armatures that pass through the centers of other PCB shapes.

BRIEF DESCRIPTION OF THE DRAWINGS

A better understanding of the present invention can be obtained when the following detailed description of the preferred embodiments are considered in conjunction with the following drawings, in which:

FIG. 14 illustrates in cross section a preferred embodiment of an assembled snap-apart electrical three-connector device having component PCBs and illustrates their respective assembled configuration.

FIGS. 18 and 19 illustrate isometric views of the deformed PCB board assemblies of FIGS. 15 through 17, assembled into two configurations.

DESCRIPTION OF THE PREFERRED EMBODIMENTS

Figure 1:
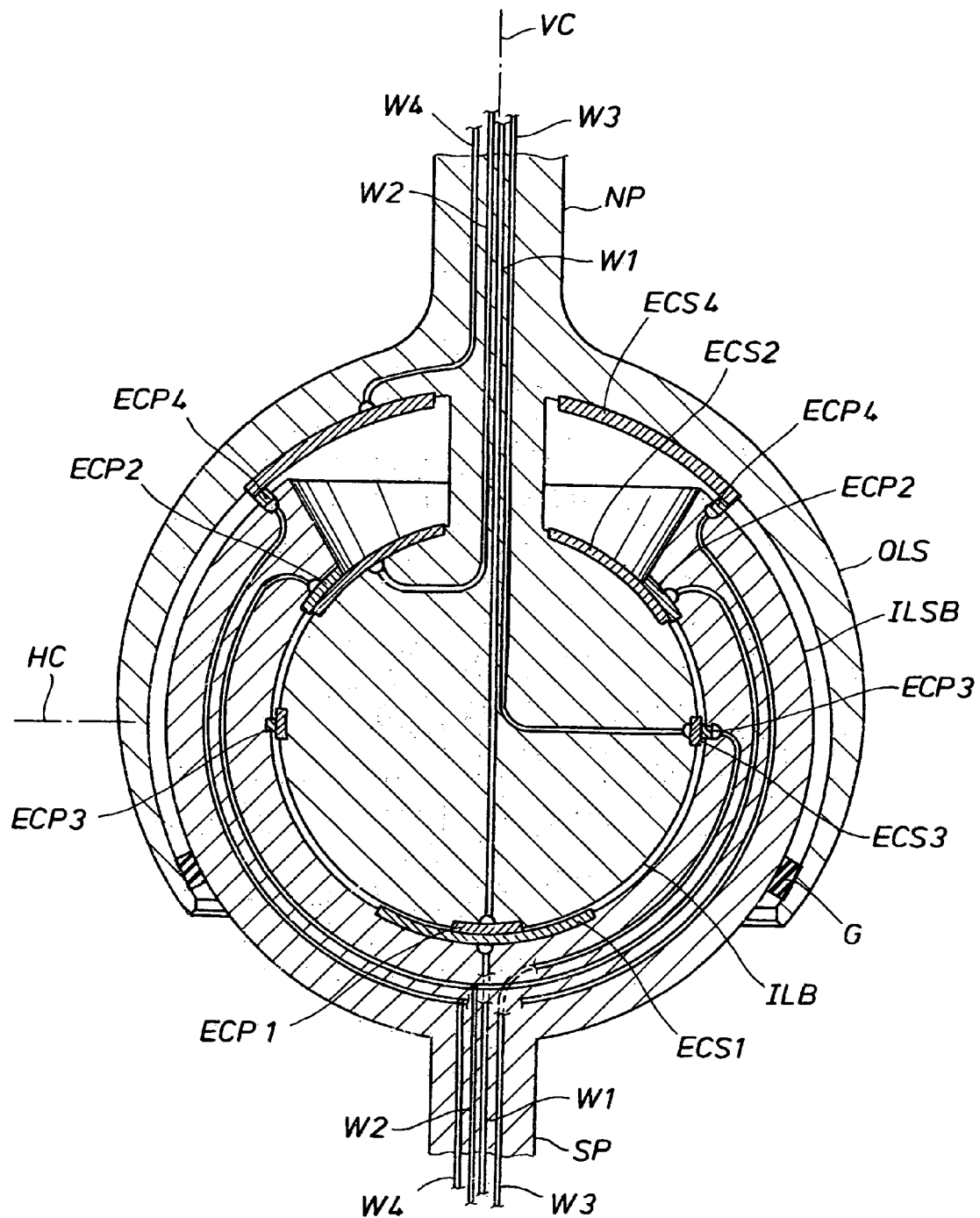
FIG. 1 illustrates an embodiment of a four connector snap-apart connection device of the instant invention. Four electrical connections are provided between four lines running upward and downward through the connector device of FIG. 1. A compressive water-proof gasket is further illustrated between the outer layer and the intermediate layer.
Figure 2:
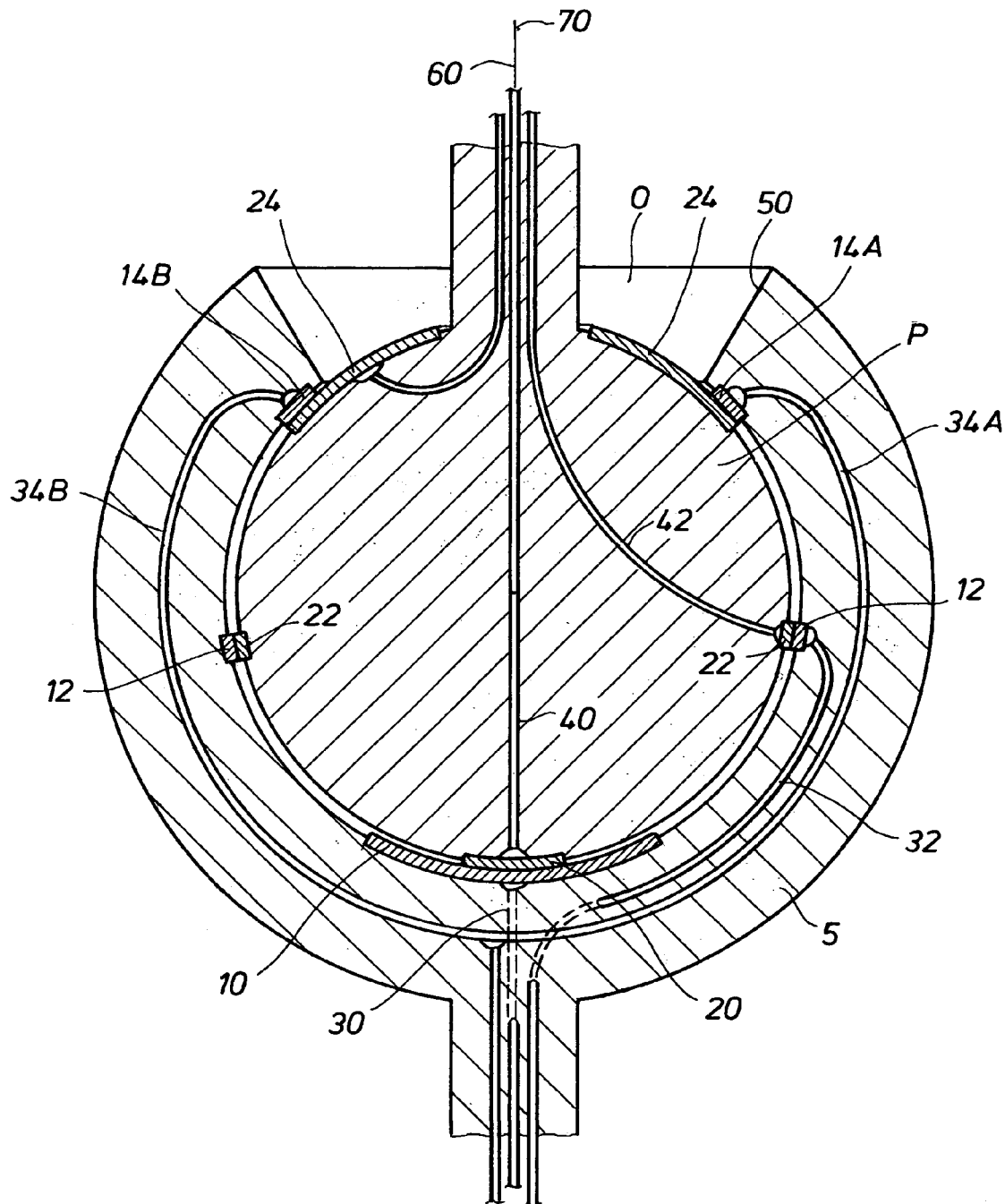
FIG. 2 illustrates an embodiment of a three connector snap-apart connection device, according to the prior art.
Figure 3:
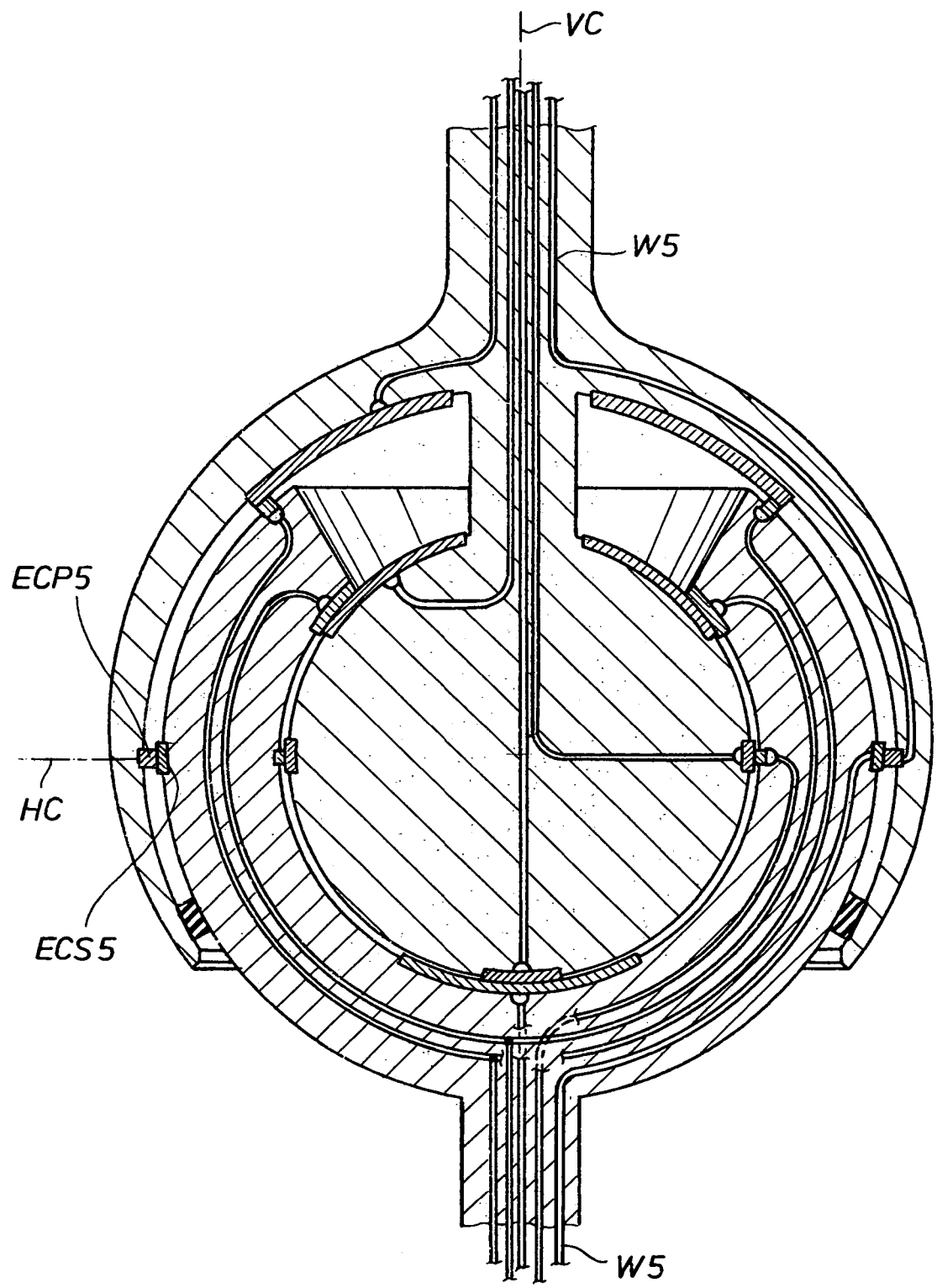
FIG. 3 illustrates the placement of a fifth contact point in the embodiment of FIG. 1.
Figure 4:
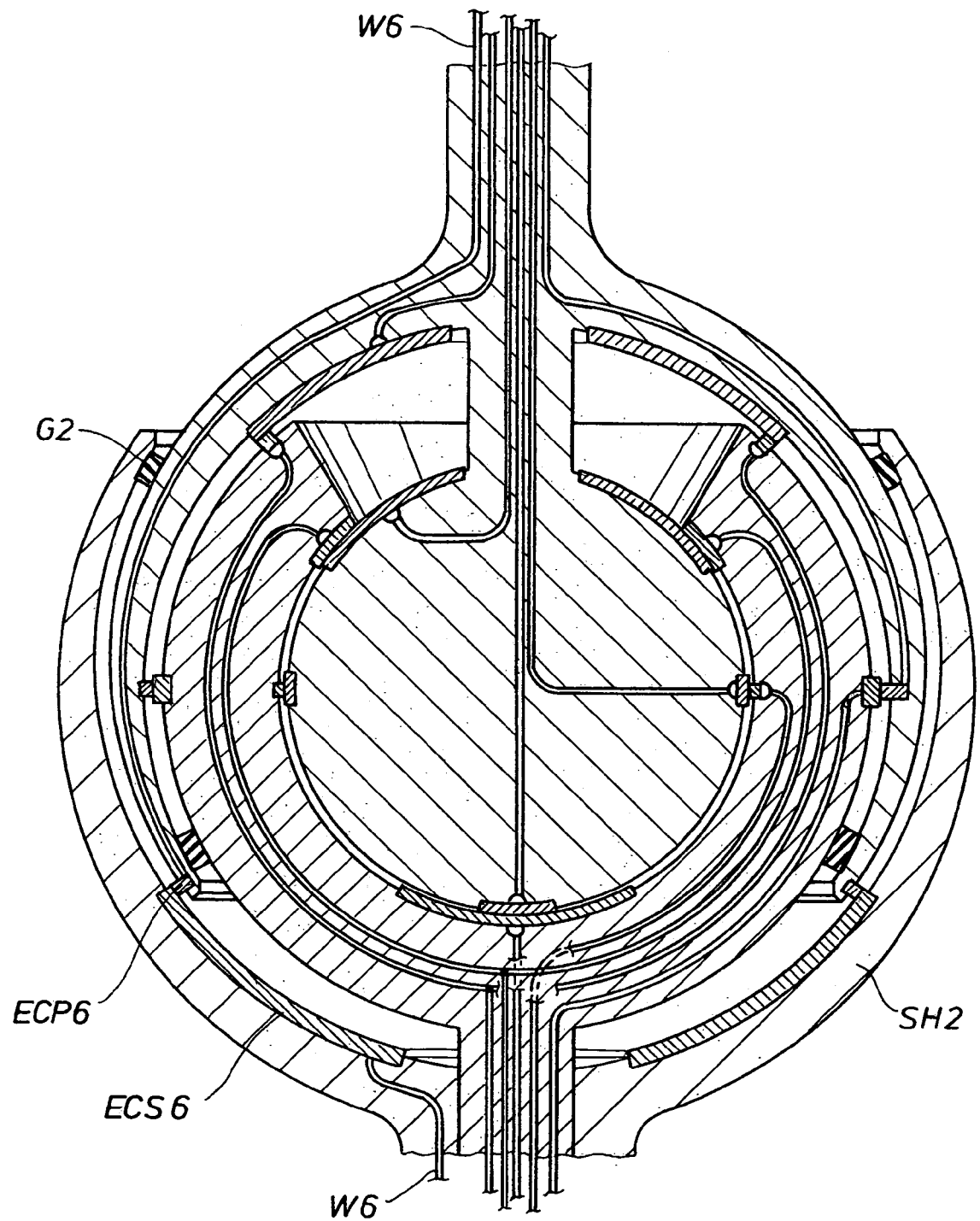
FIG. 4 illustrates an alternate embodiment providing for a plurality of shells and six contact points, based on the structure of FIG. 1.

As illustrated in FIGS. 1 and 2, hollow socket or hollow socket/ball layers can be configured to rotate over an inner ball layer, and in addition, the socket(s) can rotate within an outer shell layer. The inner ball and outer shell can form a unitary piece. As illustrated in FIGS. 1 and 4, a provision for an at least fourth connector, as frequently required for telecommunications, can be accommodated. Even a fifth connector can be provided. Review of FIG. 3 illustrates that a fifth electrical or electronic communication link could be provided between an outer shell and an inner intermediate layer at approximately an equatorial location. This would be analogous to a connection provided between the elements 12 and 22 on the original "ball and socket" connector of FIG. 2. If only four electrical connection paths were needed, any four of the five potential paths of FIG. 3 could be utilized. FIG. 4 illustrates a six-connector embodiment.

One paradigmatic use for such snap-apart connector devices for telecommunications lies in adaptor strips, wherein multi-connections are provided.

Referring to the drawings in more detail, FIG. 2 is described in detail in the patent incorporated by reference. FIG. 1 illustrates an embodiment of an adjustable electrical connection system providing at least four electrical contact points. Wires W1, W2, W3 and W4, suitable for communicating electrical power or data signals, are shown entering the connection device from the top, or north, pole NP and exiting the connection device from the lower, or south, pole SP. The device provides for continuous electrical contact and communication along the wires W1, W2, W3 and W4. Rotation of the north pole NP with respect to the south pole SP does not cause loss of connection or twisting of the south pole wires, and vice versa. Tilting of north pole NP, up to about 30° in the respect to south pole SP, does not result in loss of connection or torqueing of the south pole wires, and vice versa.

The device is comprised of an inner layer ball ILB connected to an outer layer shell OLS which (preferably) snaps into and over an intermediate layer socket/ball ILSB. Four electrically conducting surfaces and mating electrically conductive "contact points" are illustrated in FIG. 1. (Note that a "contact point" typically comprises a strip or band or area of material. The word "point" is used for convenience.)

Toward the bottom of the embodiment of FIG. 1 electrically conductive surface ECS1 resides on the lower inside surface of intermediate layer socket/ball. Electrically conductive surface ECS1 mates with electrically conductive contact point ECP1 residing on the lower or south end of the inner layer or ball ILB. Again, although a "contact point" may be appear to be a point in the cross-sectional illustrative drawing, in actuality the contact points may be a strip or a band or an area. Electrically conductive point ECP1, that resides on the lower pole of the inner layer ball ILB, is also indicated by character 20 in the prior art patents incorporated by reference, wherein ECS1 is indicated by character 10.

The prior art patents, incorporated by reference herein, illustrate how electrically conductive surfaces ECS1, ECS2 and ECS3 maintain electrical contact with contact points ECP1, ECP2 and ECP3, respectively, during rotation of the north pole with respect to the south pole and during limited tilting of the north pole with respect to the south pole of the connector device. ECS1 and ECP1 correspond to characters 10 and 20 in the prior art patent. ECS2 and ECP2 correspond to characters 24 and 14A/14B in the prior art patent. ECS3 and ECP3 correspond to elements 22 and 12 in the prior art patent.

The novel fourth connector surface and contact point is provided by ECS4 and ECP4, and is located as shown and described above. ECS4 should be understood to comprise a band of material.

FIG. 1 further illustrates the placement of a compressible weatherproof gasket G between end portions of the shell OLS and intermediate layer ILSB.

FIG. 3 illustrates the placement of a fifth electrical or digital data connection relating to the embodiment of FIG. 1. An electrically conducting contacting surface ECS5 is created around the exterior of the equator of the socket or intermediate layer. This contact surface is typically a band. An electrically conductive contact point ECP5 is created to mate with the electrically conductive contact surface ECS5, and is situated upon the equator of the interior of the outer layer or shell. Again, the electrically conductive contact point is typically an equatorial band in such manner a fifth conductive path is created through the connection device.

FIG. 4 illustrates a further alternative embodiment based upon the structure of FIG. 1. FIG. 4 illustrates the capacity to add additional shells providing additional electrical contacts as well as extra weatherproof gaskets. FIG. 4 shows a second shell SH2 connected to the intermediate layer or socket. A potentially sixth electrical connection is provided by the lower electrically conductive surface band ECS6 located on the interior of the second shell SH2 and provided by electrically conductive contact point ECP6 located on a lower exterior portion of the first shell. A second weatherproof gasket G2 is further provided to enhance protection from the environment.

Figure 5:
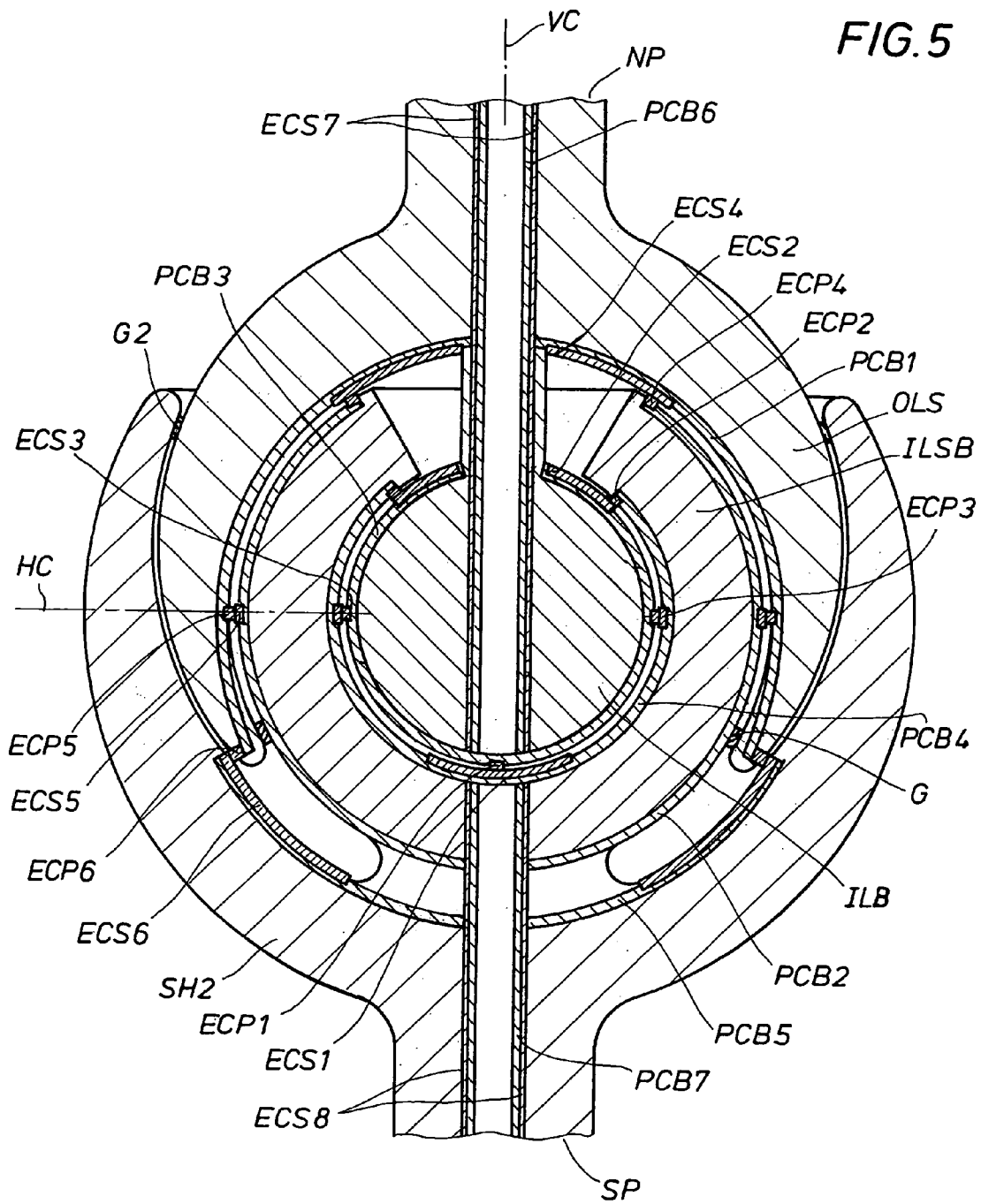
FIG. 5 illustrates in cross section a preferred embodiment of an assembled snap-apart electrical six-connector device having component PCBs and illustrates their respective assembled configuration.
Figure 6A:
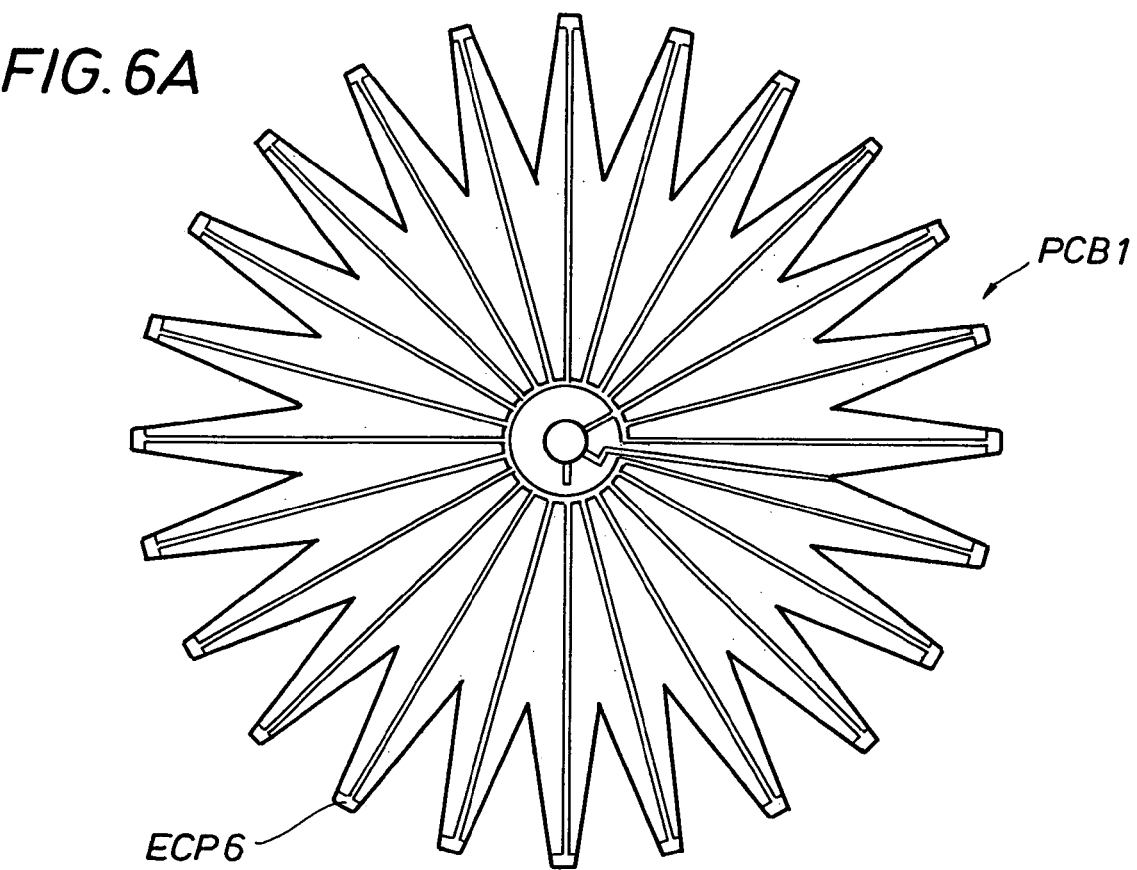
FIGS. 6-11 illustrate individual pre-deformed PCB components for the embodiment of FIG. 5, as they would appear after the stamping and cutting process but prior to heat deformation into hemispherical and/or spherical shapes.
Figure 6B:
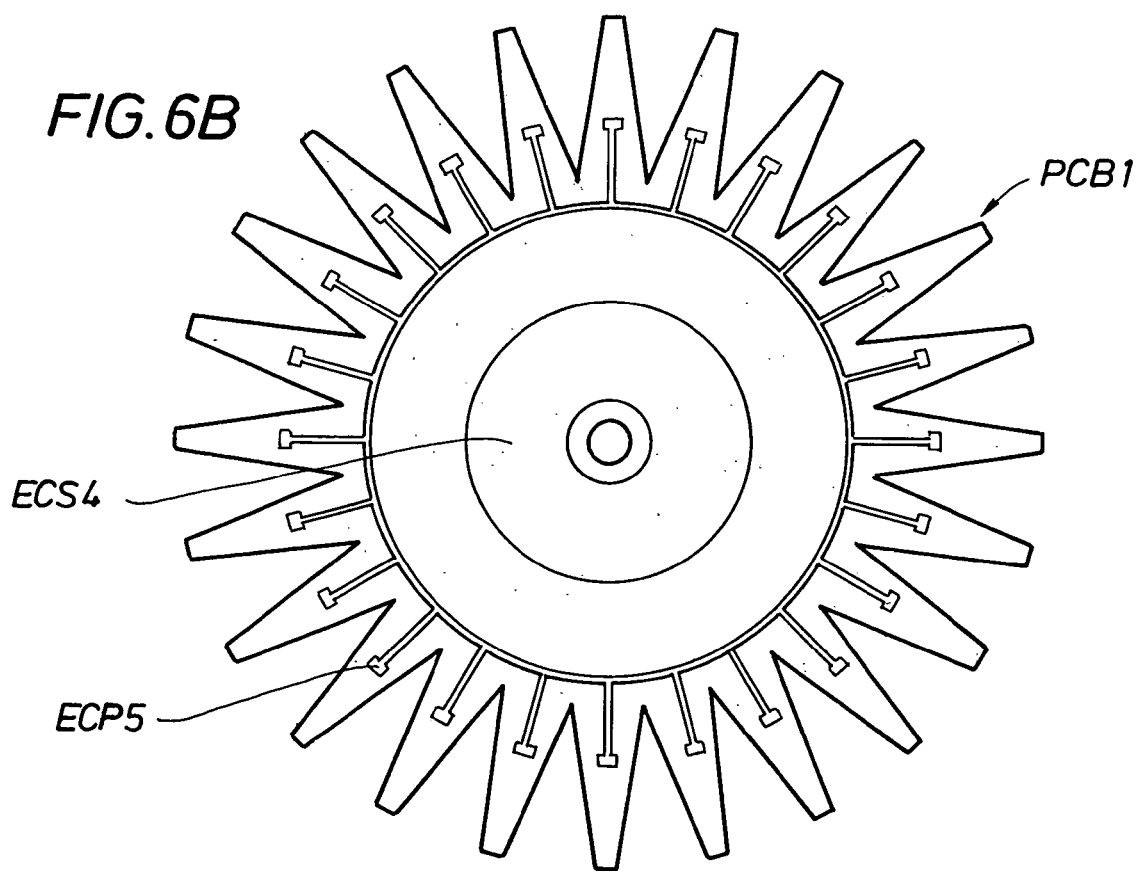
Figure 7A:
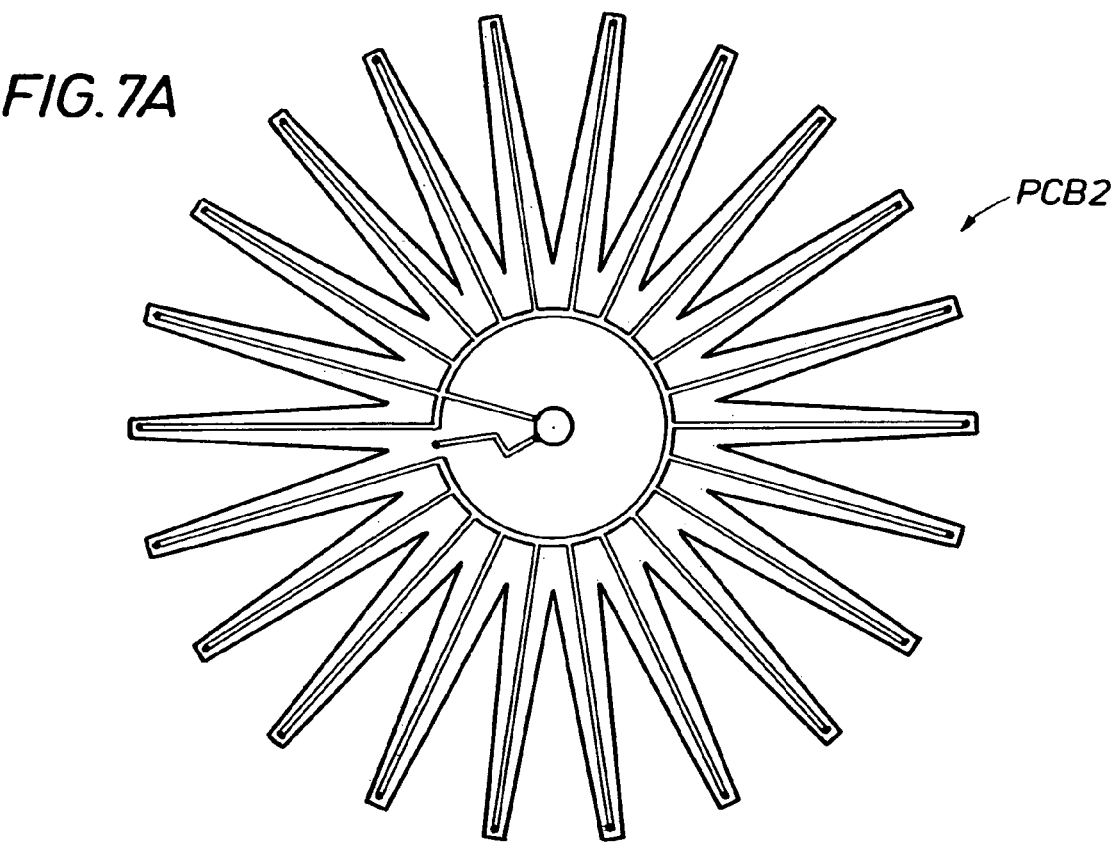
Figure 7B:
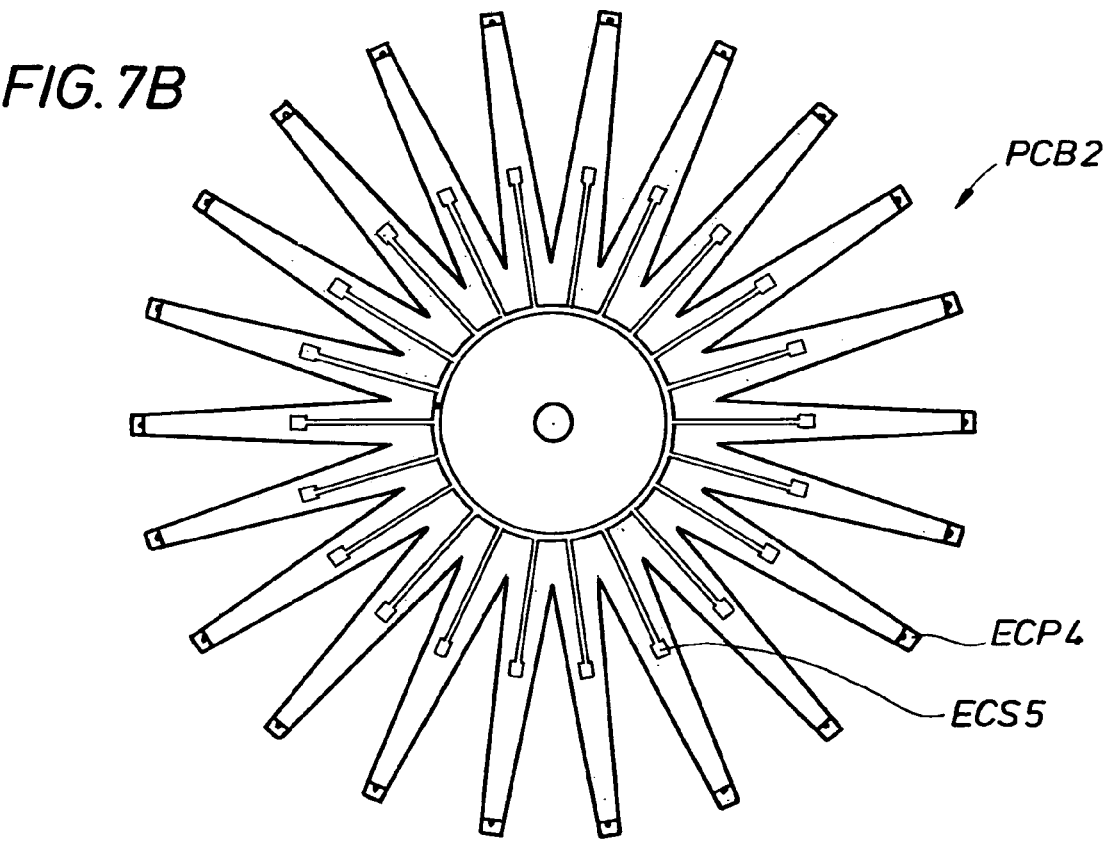
Figure 8A:
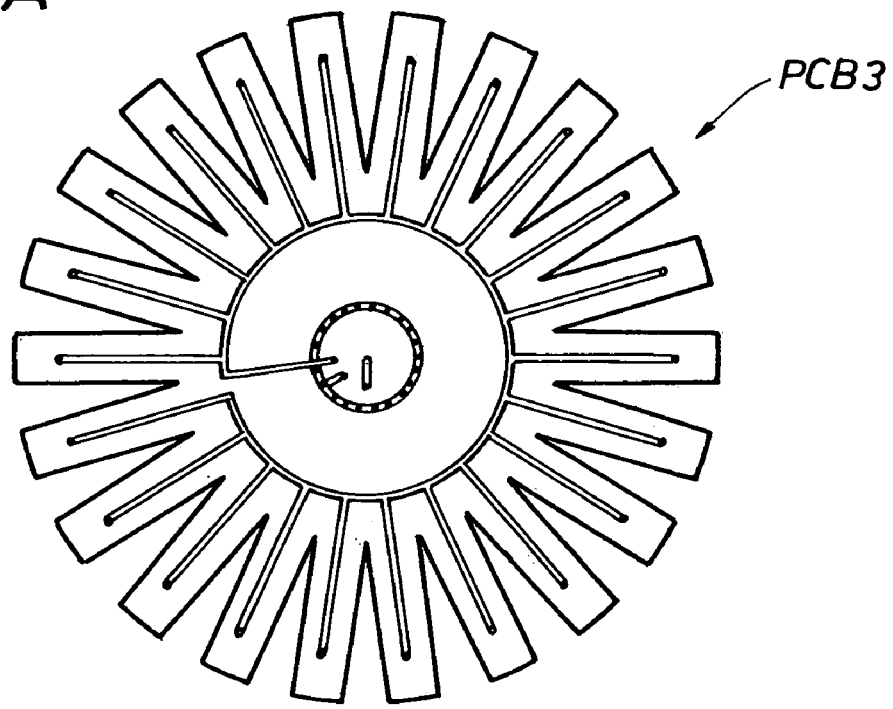
Figure 8B:
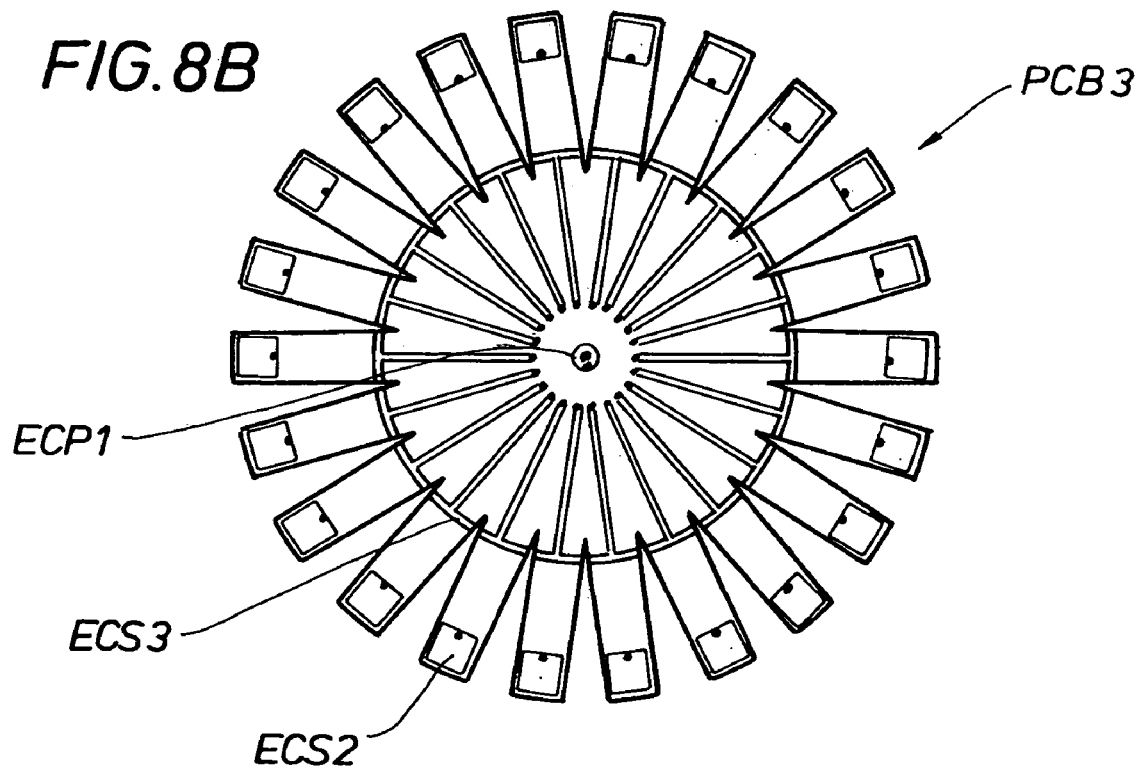
Figure 9A:
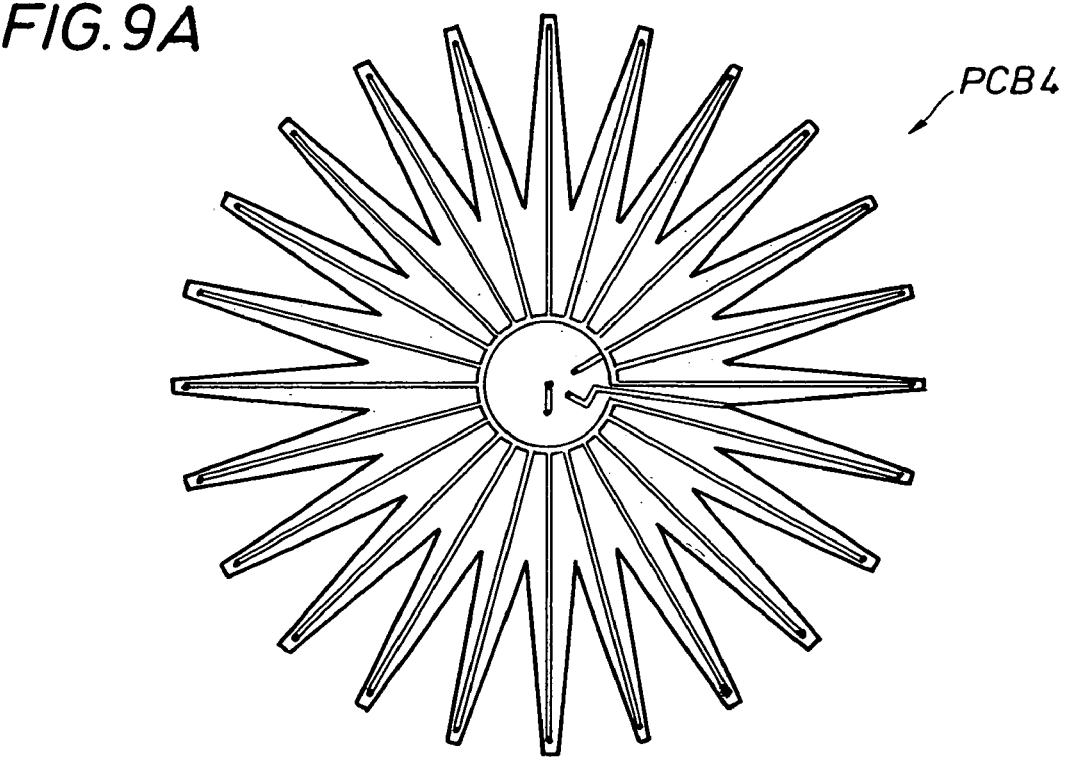
Figure 9B:
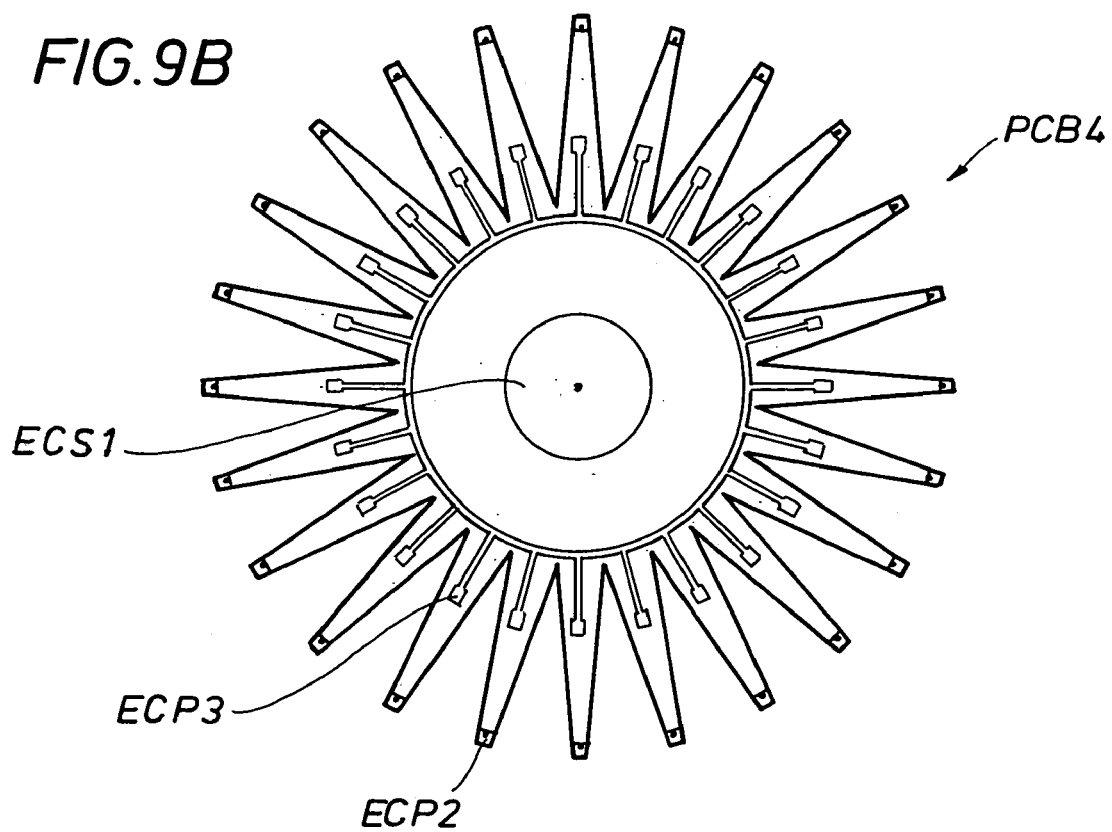
Figure 10A:
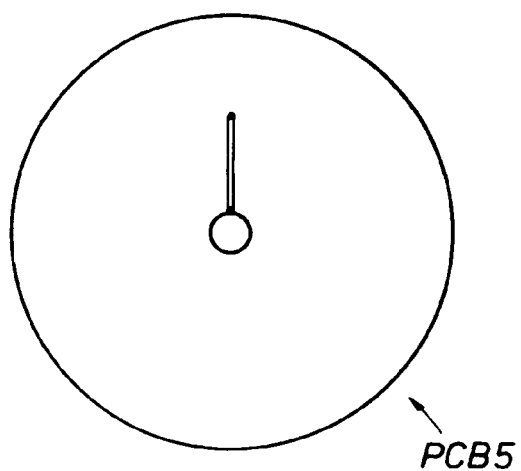
Figure 10B:
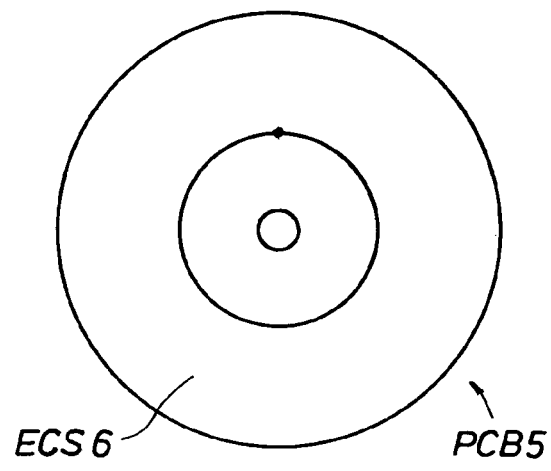
Figure 11A:
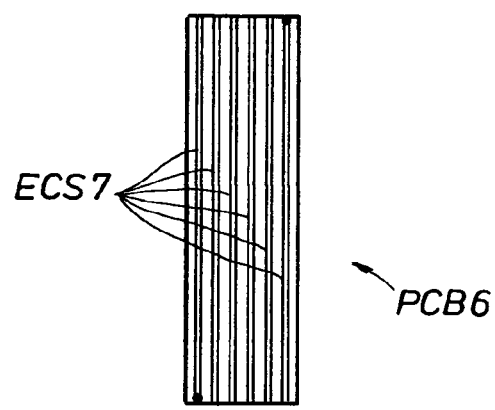
Figure 11B:
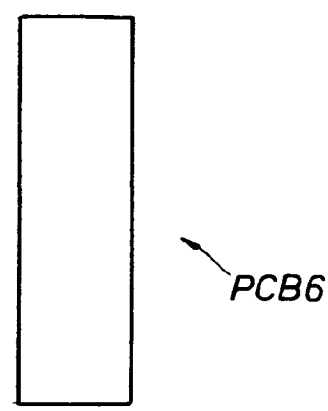
Figure 11C:
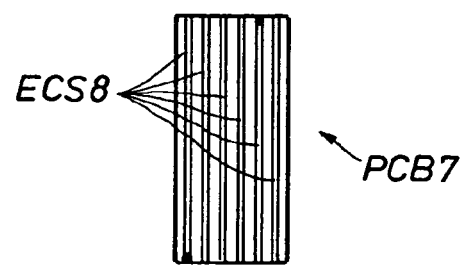
Figure 11D:
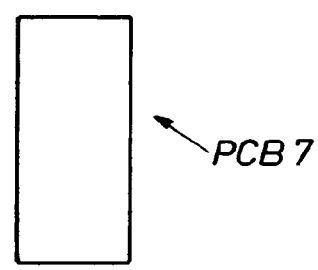

FIG. 5 illustrates in cross section an assembled snap-apart electrical device utilizing component deformed PCBs in their respective assemblies.

FIGS. 6-11 illustrate individual pre-deformed PCB components for use in the embodiment of FIG. 5, illustrated as they would appear after a stamping and cutting process, but prior to a heat deformation process to assume hemispherical and/or cylindrical shapes; (PCB 6 and 7 are the only cylindrical shapes.)

Figure 12:
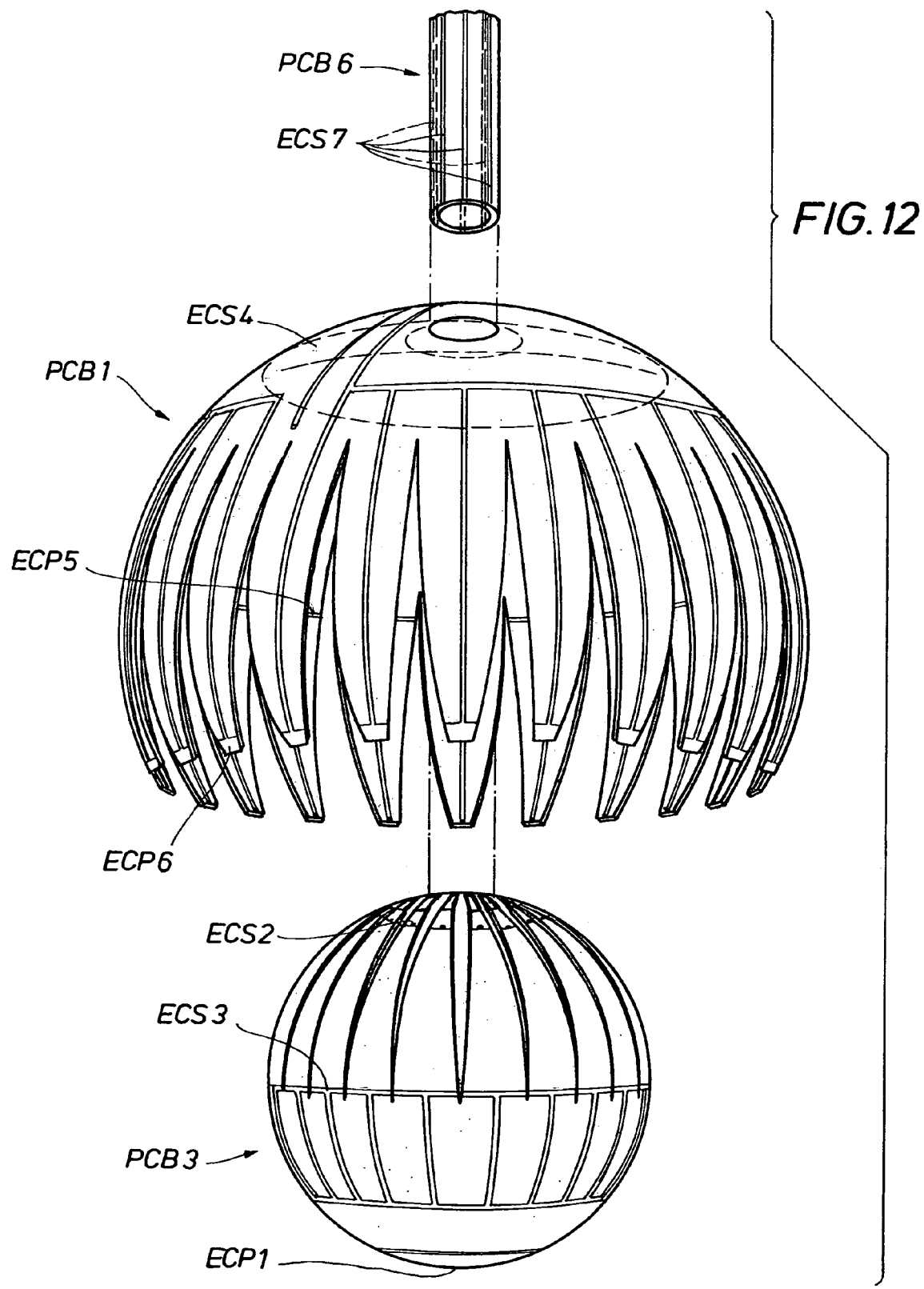
FIGS. 12 and 13 illustrate isometric views of the deformed PCB board assemblies of FIGS. 5-11, set into two configurations.
Figure 13:
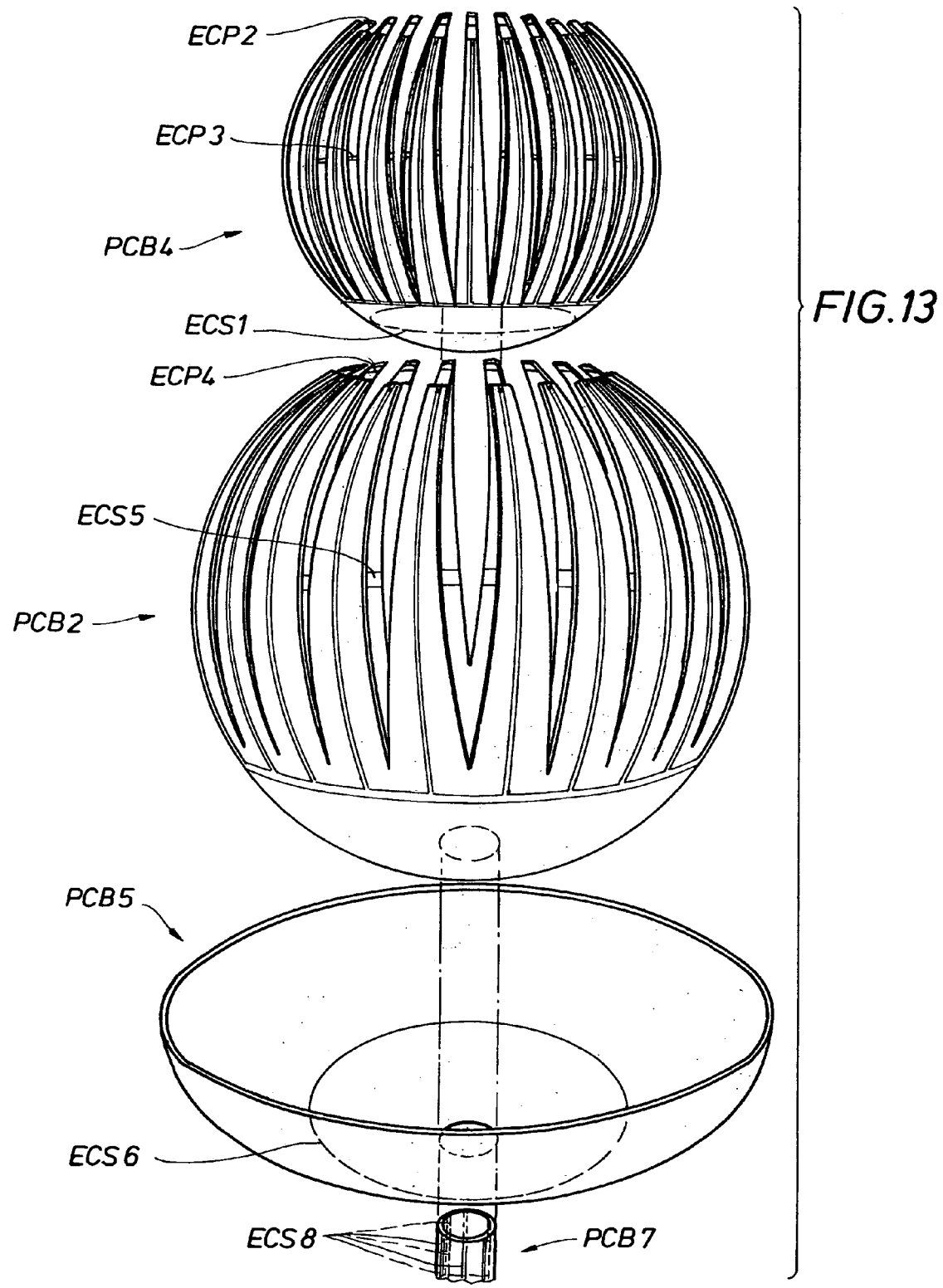

FIGS. 12 and 13 offer an isometric view of a first PCB assembly, comprising components PCB 1, 3 and 6, and a second PCB assembly, comprising components 2, 4, 5 and 7, respectively, the PCBs deformed and thus indicating their three dimensional shapes, as per the embodiment of FIG. 5.

Figure 15A:
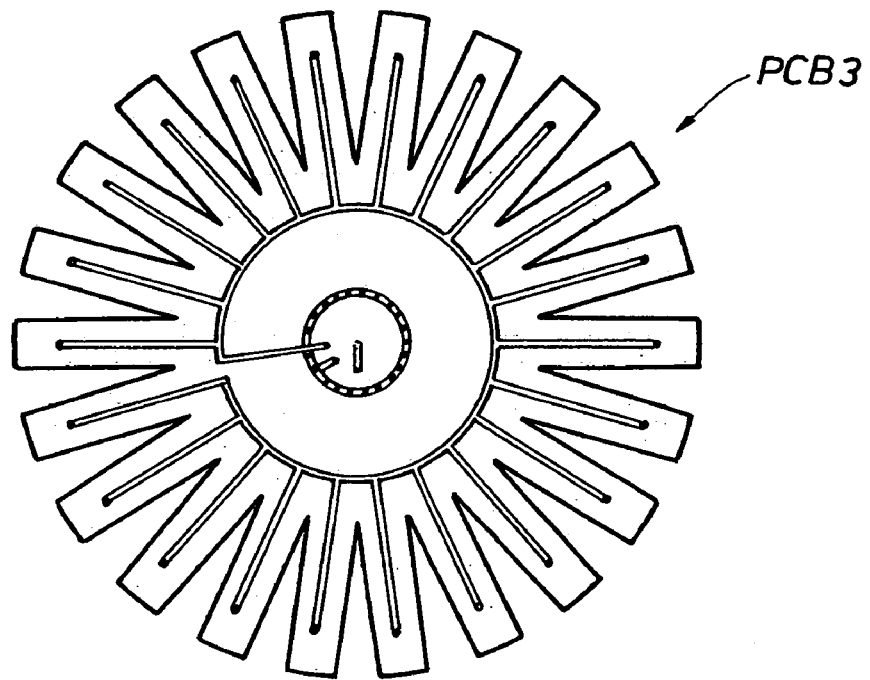
FIGS. 15-17 illustrate individual predeformed PCB components for the embodiment of FIG. 14, as they would appear after the stamping and cutting process but prior to heat deformation into hemispherical and/or spherical shapes.
Figure 15B:
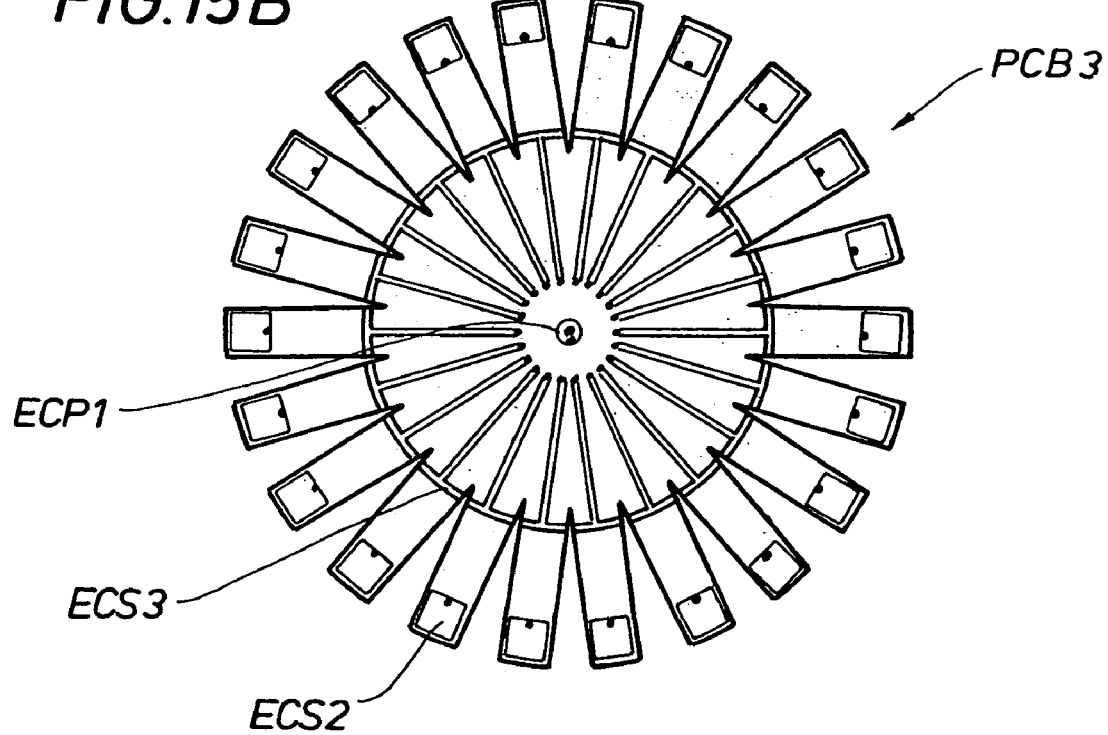
Figure 16A:
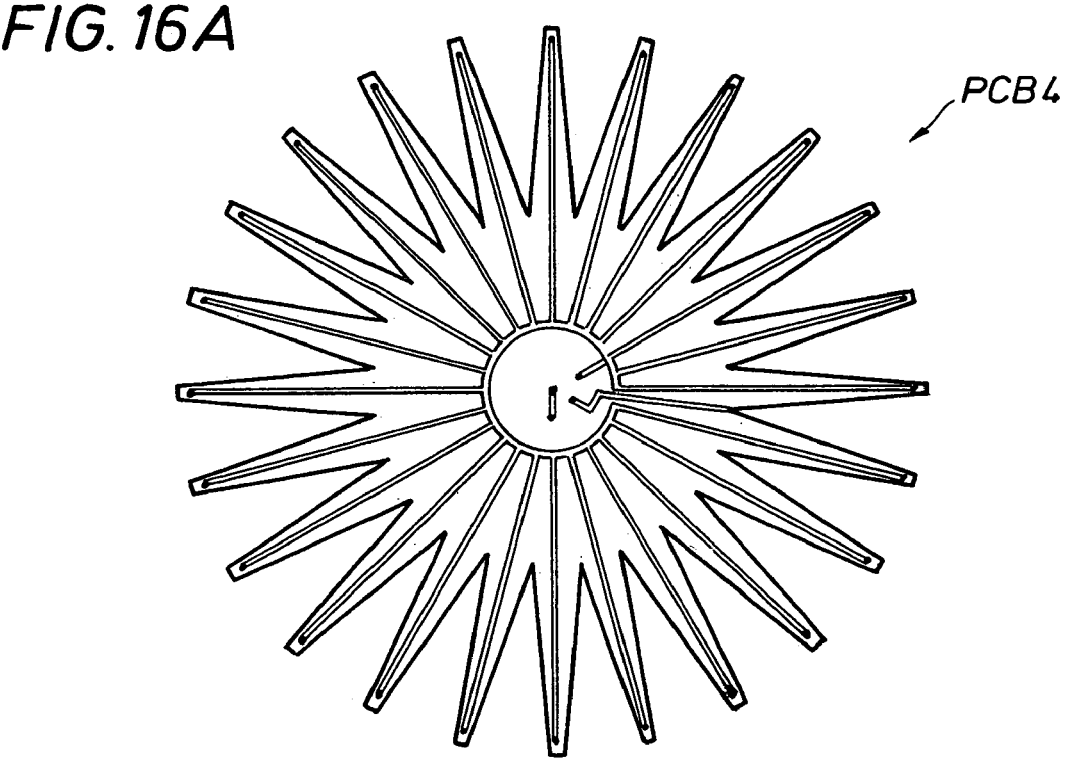
Figure 16B:
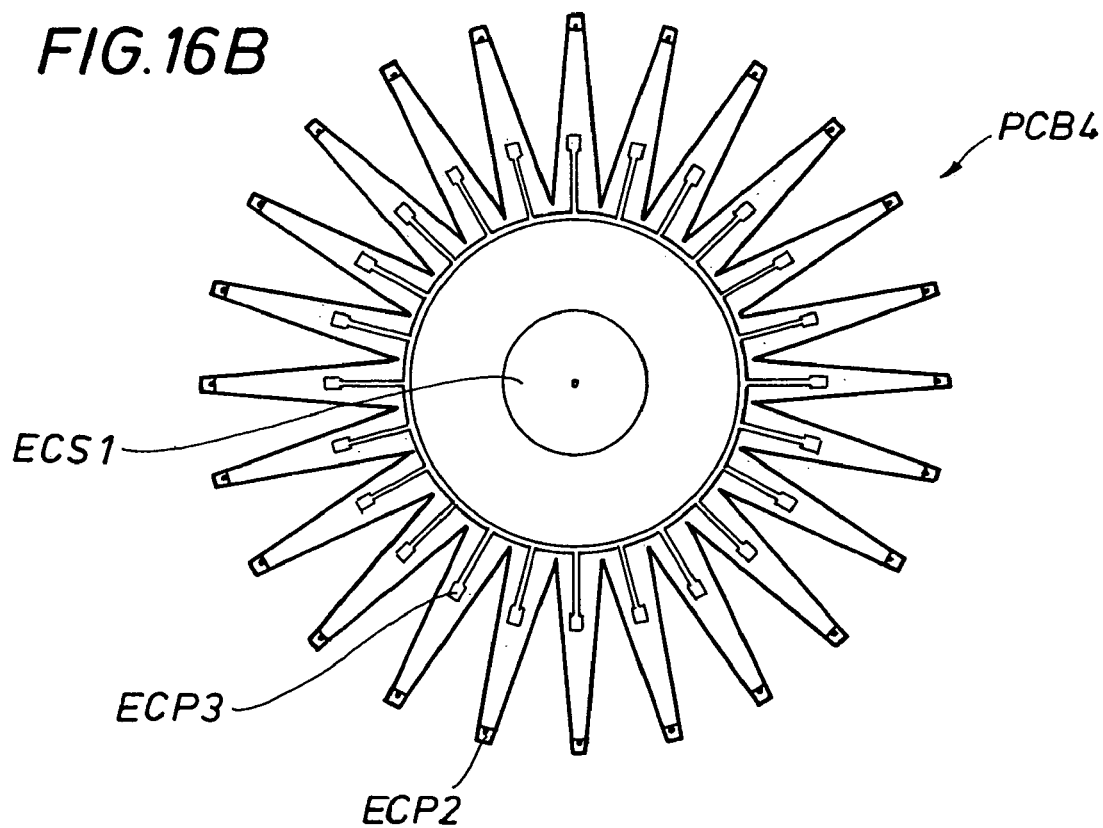
Figure 17A:
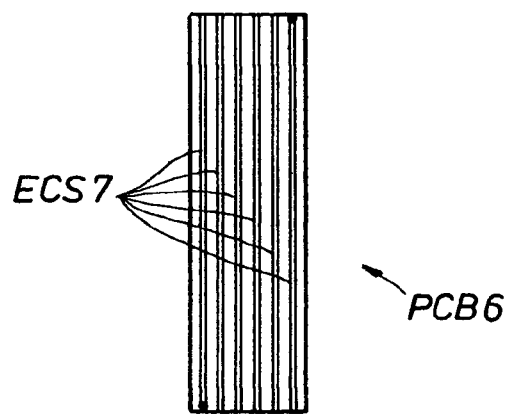
Figure 17B:
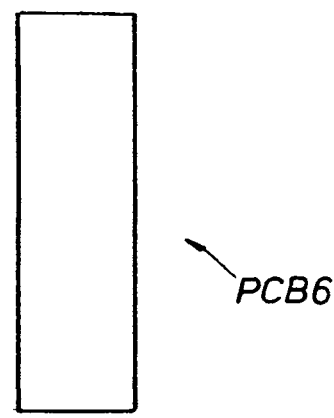
Figure 17C:
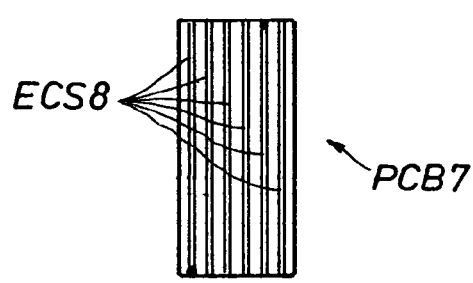
Figure 17D:
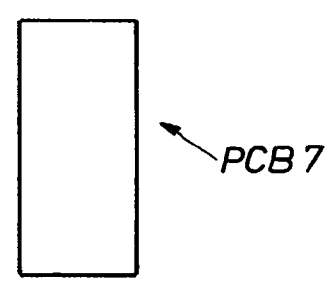

FIG. 5 relates to the at least four connector device embodiment of FIG. 1. Prior art FIG. 2 relates to a three connector device as discussed in detail in U.S. Pat. No. 4,978,306, incorporated herein by reference. FIG. 14 illustrates in cross section an assembled snap-apart electrical device for the embodiment of FIG. 2 having component deformed PCBs in their respective assembled position. FIGS. 15-17 illustrate individual predeformed PCB components for use in the embodiment of FIG. 14, the components illustrated as they would appear after stamping and cutting but prior to heat deformation into a hemispherical and/or cylindrical shape.

Figure 19:
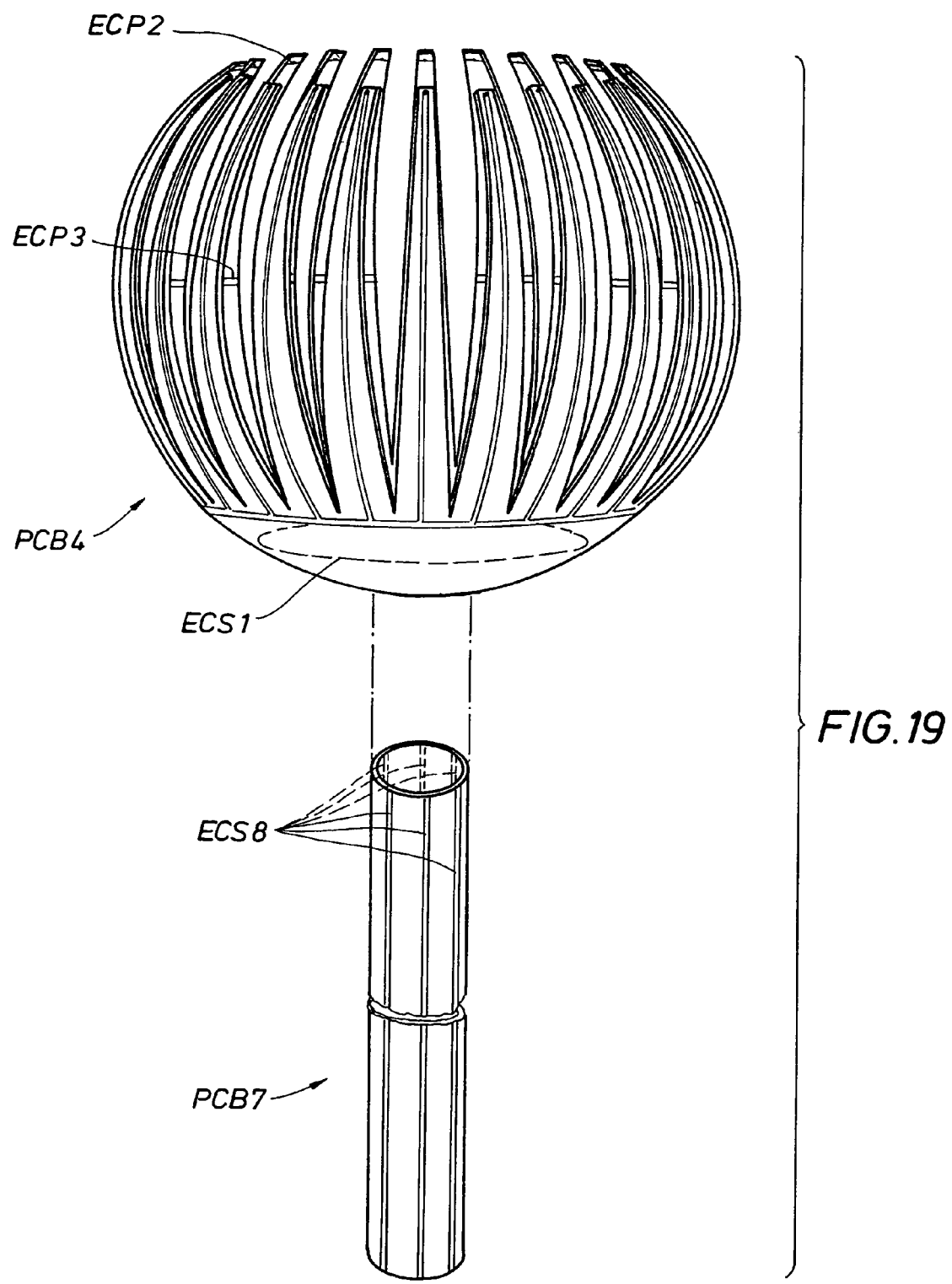

FIGS. 18 and 19 offer an isometric view of PCB assemblies deformed into their three-dimensional configurations as per FIGS. 2 and 14.

In operation, in accordance with a preferred manufacturing embodiment, multiple PCBs of different designs are printed flat using a copper foil stamping technique on a sheet of heated deformable plastic, while simultaneously cutting the sheet of deformable plastic into the desired shape(s). Each PCB has a unique stamping on a side A and a side B on electrical circuitry. Circuitry on side A is preferably connected to appropriate circuitry on side B by a punching and soldering technique at specific contact points.

Preferably using a heat molding technique the stamp cut and punched and punch soldered PCBs are deformed into hemispherical shapes and/or cylindrical shapes of the appropriate diameters.

Groups of deformed PCBs are thus assembled, using, for example PCB 6 assembled into a cylinder and PCB 7 assembled into a cylinder to provide "armatures" that pass through the centers of other PCB components.

A soldering technique then joins the individual PCB components through the armatures and completes the electrical circuitry for the assembly, assembly A and assembly B, of PCB components.

Electrically conductive wire can be soldered to the appropriate contact points at the end of the armatures, e.g. PCB 6 and PCB 7, both of assembly A and assembly B.

Assembly A and assembly B are then preferably placed in their own separate unique injection molding dyes and subsequently embedded in a thermosetting plastic material with elastomeric properties that will permit decoupling of the snap-apart electrical plug device.

The foregoing description of preferred embodiments of the invention is presented for purposes of illustration and description, and is not intended to be exhaustive or to limit the invention to the precise form or embodiment disclosed. The description was selected to best explain the principles of the invention and their practical application to enable others skilled in the art to best utilize the invention in various embodiments. Various modifications as are best suited to the particular use are contemplated. It is intended that the scope of the invention is not to be limited by the specification, but to be defined by the claims set forth below. Since the foregoing disclosure and description of the invention are illustrative and explanatory thereof, various changes in the size, shape, and materials, as well as in the details of the illustrated device may be made without departing from the spirit of the invention. The invention is claimed using terminology that depends upon a historic presumption that recitation of a single element covers one or more, and recitation of two elements covers two or more, and the like. Also, the drawings and illustration herein have not necessarily been produced to scale.

What is claimed is:

1. An adjustable at least three-way electrical connector for signal, voice, digital data and/or power, comprising:
    at least three electrical connections provided within a layered ball and socket connector device, the device providing for full rotation of at least an inner ball layer within an outer socket layer about a first axis and providing for at least approximately up to 30 degrees of pivot of the inner ball layer with respect to the outer socket layer about the first axis; and
    wherein the connector includes multiple printed circuit boards, deformed to ball and socket conformations, embedded in a thermosetting plastic material with elastomeric properties effective to permit repeated coupling and decoupling.

2. The adjustable electrical connector device of claim 1 wherein inner and outer layers, respectively, snap together and apart.

3. The electrical conductor device of claim 1 including an intermediate layer and an insulating gasket between the outer layer and the intermediate layer.

4. The device of claim 1 including an at least four-way electrical connector with an intermediate layer with respect to the inner and outer layer and an equatorially located electrical connection between equatorially located electrically conductive surfaces on the exterior of the intermediate layer and on the interior of the outer layer.

5. The device of claim 3 further providing a shell attached to the intermediate layer, the shell and outer layer structured and constructed in combination to provide at least one electrical connection and one weatherproof gasket therebetween.

6. The device of claim 4 further providing a shell attached to the intermediate layer, the shell and outer layer structured and constructed in combination to provide at least one electrical connection and one weatherproof gasket therebetween.

* * * * *